United States Patent
Konoshita et al.

(10) Patent No.: US 9,169,153 B2
(45) Date of Patent: Oct. 27, 2015

(54) OPTICAL GLASS AND OPTICAL ELEMENT

(71) Applicant: NIPPON ELECTRIC GLASS CO., LTD., Otsu-shi, Shiga (JP)

(72) Inventors: Satoko Konoshita, Otsu (JP); Akihiko Sakamoto, Otsu (JP); Michel Woy, Dresden (DE)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 14/397,258

(22) PCT Filed: Apr. 25, 2013

(86) PCT No.: PCT/JP2013/062163
§ 371 (c)(1),
(2) Date: Oct. 27, 2014

(87) PCT Pub. No.: WO2013/168579
PCT Pub. Date: Nov. 14, 2013

(65) Prior Publication Data
US 2015/0041737 A1 Feb. 12, 2015

(30) Foreign Application Priority Data
May 7, 2012 (JP) ................................. 2012-105618

(51) Int. Cl.
*C03C 3/16* (2006.01)
*C03C 3/17* (2006.01)
*C03C 4/08* (2006.01)
*G02B 1/00* (2006.01)
*G02B 5/20* (2006.01)

(52) U.S. Cl.
CPC ... *C03C 3/17* (2013.01); *C03C 3/16* (2013.01); *C03C 4/082* (2013.01); *C03C 4/085* (2013.01); *G02B 1/00* (2013.01); *G02B 5/208* (2013.01); *C03C 2204/00* (2013.01)

(58) Field of Classification Search
CPC ............ C03C 3/16; C03C 3/17; C03C 4/082; C03C 4/085; C03C 2204/00; G02B 1/00; G02B 5/208
See application file for complete search history.

(56) References Cited

U.S. PATENT DOCUMENTS

| | | |
|---|---|---|
| 5,021,366 A | 6/1991 | Aitken |
| 2004/0138043 A1 | 7/2004 | Kasuga et al. |
| 2005/0054511 A1 | 3/2005 | Fujiwara et al. |
| 2006/0142413 A1 | 6/2006 | Zimmer et al. |
| 2006/0166806 A1 | 7/2006 | Fechner et al. |
| 2006/0172877 A1 | 8/2006 | Fechner et al. |
| 2008/0187737 A1 | 8/2008 | Fujiwara et al. |
| 2008/0207427 A1 | 8/2008 | Ohkawa et al. |

FOREIGN PATENT DOCUMENTS

| | | |
|---|---|---|
| JP | 3164223 B2 | 5/2001 |
| JP | 2004-217513 A | 8/2004 |
| JP | 2005-082406 A | 3/2005 |
| JP | 2006-518696 A | 8/2006 |
| WO | 2007/049622 A1 | 5/2007 |

OTHER PUBLICATIONS

Official Communication issued in International Patent Application No. PCT/JP2013/062163, mailed on Jul. 16, 2013.

*Primary Examiner* — Veronica F Faison
*Assistant Examiner* — Elizabeth A Bolden
(74) *Attorney, Agent, or Firm* — Keating & Bennett, LLP

(57) ABSTRACT

Provided is an optical glass having desired optical properties, excellent weather resistance, and high mass productivity. An optical glass having a glass composition, in % by mole based on oxide, of 5 to 40% $P_2O_5$, 1 to 35% $SO_3$, 10 to 30% $R'_2O$ (where R' is Li, Na or K), 20 to 50% RO (where R is Mg, Ca, Sr, Ba or Zn), and 0.001 to 15% $CuO+Fe_2O_3+CoO+CeO_2$.

3 Claims, 3 Drawing Sheets

No. 4

No. 15

No. 4

No. 13

OPTICAL GLASS AND OPTICAL ELEMENT

TECHNICAL FIELD

This invention relates to optical glasses and optical elements suitable as lenses for digital cameras, heat-absorbing glass, IR/UV-absorbing glass, and so on.

BACKGROUND ART

Conventionally, phosphate glasses are widely used as optical glasses for use in electronic devices and the like. Phosphate glasses have high visible transmittance and can efficiently absorb near-infrared to infrared light depending upon composition. Therefore, phosphate glasses are widely used in the electronic field, for example, as lenses for digital cameras, heat-absorbing glass, and IR/UV-absorbing glass.

For example, Patent Literature 1 describes a substantially fluorine-free phosphate glass containing $P_2O_5$, SnO, ZnO, an alkali metal oxide, and an alkaline earth metal oxide as essential components and having an annealing point in a temperature range of 300° C. to 340° C., a refractive index of approximately 1.605, and a coefficient of linear thermal expansion ranging from $145 \times 10^{-7}$ to $170 \times 10^{-7}$/° C.

Patent Literature 2 describes a phosphate optical glass containing $P_2O_5$, $Al_2O_3$, and $K_2O$ or $Li_2O$ as essential components and having such optical constants as a refractive index of 1.45 to 1.65 and an Abbe's number of 65 or more.

CITATION LIST

Patent Literature

Patent Literature 1: Japanese Patent No. 3164223
Patent Literature 2: WO2007/049622

SUMMARY OF INVENTION

Technical Problem

The aforementioned phosphate glasses have low weather resistance, i.e., are likely to cause tarnish or weathering-induced erosion on their surfaces during long-term use, and are therefore of less practical use. Furthermore, $P_2O_5$, a raw material for phosphate glass, is likely to evaporate during melting. This presents a problem in that a composition having a large $P_2O_5$ content is less likely to provide homogeneous glass and therefore poor in mass productivity.

In view of the above, an object of the present invention is to provide an optical glass having desired optical properties, excellent weather resistance, and high mass productivity.

Solution to Problem

The present invention relates to an optical glass having a glass composition, in % by mole based on oxide, of 5 to 40% $P_2O_5$, to 35% $SO_3$, 10 to 30% $R'_2O$ (where R' is Li, Na or K), 20 to 50% RO (where R is Mg, Ca, Sr, Ba or Zn), and 0.001 to 15% $CuO+Fe_2O_3+CoO+CeO_2$.

The inventors have found from various studies that a phosphate optical glass containing $SO_3$ and a predetermined amount of one or more of CuO, $Fe_2O_3$, CoO, and $CeO_2$ can achieve desired optical properties and concurrently improve weather resistance and provide glass stability during melting.

Furthermore, CuO, $Fe_2O_3$, CoO, and $CeO_2$ have properties of absorbing light in their respective predetermined wavelength ranges. Therefore, by containing these components as appropriate, an optical glass element capable of absorbing light in a desired wavelength range can be obtained.

Note that, generally, if CuO, $Fe_2O_3$, CoO, and $CeO_2$ are contained in a general phosphate glass, vitrification tends to become unstable. However, when a phosphate glass contains, together with the above components, a predetermined amount of $SO_3$, these components have a synergetic effect to stabilize vitrification and improve the weather resistance.

Secondly, the optical glass of the present invention preferably has a Class 1 to 5 rating when subjected to a water resistance test specified in JOGIS.

With this configuration, an optical glass can be provided which is less likely to occur degradation, such as tarnish or weathering-induced erosion, during long-term use.

Thirdly, the present invention relates to an optical element made of any one of the aforementioned optical glasses.

Advantageous Effects of Invention

The present invention can provide an optical glass having desired optical properties, excellent weather resistance, and high mass productivity.

DESCRIPTION OF EMBODIMENTS

Figure 1:
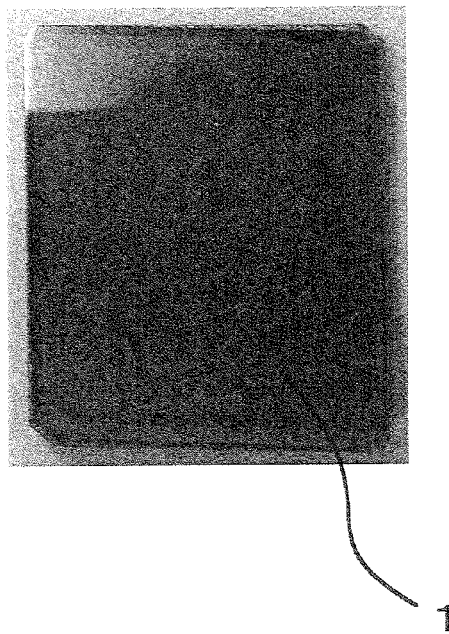
FIG. 1 is photographs of samples No. 4 and No. 15 as examples after being subjected to a weather resistance test.
Figure 1:
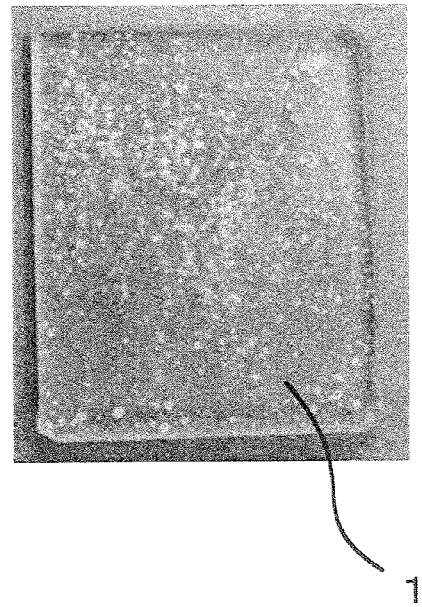

A description will be given below of the reasons why the composition of the optical glass of the present invention is limited as described above. Unless otherwise stated, "%" as used in the following description of components means "% by mole".

$P_2O_5$ is an essential component for forming the glass network. The $P_2O_5$ content is 5 to 40%, preferably 10 to 30%, more preferably 15 to 25%, and still more preferably 15 to 20%. If the $P_2O_5$ content is too small, vitrification tends to become unstable. On the other hand, if the $P_2O_5$ content is too large, the weather resistance is likely to deteriorate.

$SO_3$ is an effective component to improve the weather resistance while maintaining optical properties. $SO_3$ is also effective to stabilize vitrification. The $SO_3$ content is 1 to 35%, preferably 5 to 30%, more preferably 10 to 25%, and still more preferably 15 to 20%. If the $SO_3$ content is too small, the above effects are difficult to obtain. On the other hand, if the $SO_3$ content is too large, vitrification tends to become unstable.

$R'_2O$ (where R' is Li, Na or K) is a component for stabilizing vitrification. The $R'_2O$ content is 10 to 30%, preferably 12 to 28%, and more preferably 15 to 23%. If the $R'_2O$ content is too small, vitrification tends to become unstable. On the other hand, if the $R'_2O$ content is too large, vitrification tends to become unstable and the weather resistance tends to deteriorate. $R'_2O$ contained in the composition may be any one of $Li_2O$, $Na_2O$, and $K_2O$ or may be two or more of them. If two or more of them are contained in the composition, the total content thereof needs to meet the above range.

The respective contents of the above R'$_2$O components are preferably as follows.

The Li$_2$O content is preferably 0 to 5% and more preferably 0 to 3%. If the Li$_2$O content is too large, phase separation tends to occur to make vitrification unstable.

Na$_2$O is a component for giving the most stable vitrification range under the influence of its ionic radius and ligand field. Therefore, when, among R'$_2$O components, Na$_2$O is positively contained in the composition, the effect of stabilizing vitrification can be easily obtained. Hence, the Na$_2$O content is preferably 5 to 30%, more preferably 12 to 28%, and still more preferably 15 to 23%.

K$_2$O can be contained for the purpose of controlling the viscosity. However, if its content is too large, vitrification tends to become unstable to cause phase separation. Therefore, the K$_2$O content is preferably 0 to 10% and more preferably 0 to 8%.

RO (where R is Mg, Ca, Sr, Ba or Zn) is also an essential component for stable vitrification. Furthermore, RO has the effect of improving the weather resistance. The RO content is 20 to 50%, preferably 25 to 48%, and more preferably 30 to 45%. If the RO content is too small, vitrification tends to become unstable. In addition, the weather resistance tends to be poor. On the other hand, if the RO content is too large, vitrification tends to become unstable rather than stable. RO contained in the composition may be any one of MgO, CaO, SrO, BaO, and ZnO or may be two or more of them. If two or more of them are contained in the composition, the total content thereof needs to meet the above range.

The respective contents of the above RO components are preferably as follows.

Each of the CaO, SrO, BaO, and MgO contents is preferably 0 to 20%, more preferably 0 to 10%, and particularly preferably 0.1 to 8%.

ZnO is, among the RO components, a component particularly highly effective to stabilize vitrification and improve the weather resistance. The ZnO content is preferably 10 to 50%, more preferably 20 to 48%, still more preferably 25 to 48%, and particularly preferably 30 to 45%.

Furthermore, when the optical glass of the present invention contains one or more of CuO, Fe$_2$O$_3$, CoO, and CeO$_2$, it can absorb light in a particular wavelength range. In addition, these components, in the coexistence with SO$_3$, have the effect of strengthening the phosphate network of the glass and improving the weather resistance. The content of CuO, Fe$_2$O$_3$, CoO, and CeO$_2$, in total, is 0.001 to 15%, preferably 0.01 to 12%, more preferably 0.1 to 10%, and still more preferably 0.1 to 9%. If the content of these components is too small, the above effects are difficult to obtain. On the other hand, if the content of these components is too large, vitrification tends to become unstable.

Each of the CuO, Fe$_2$O$_3$, CoO, and CeO$_2$ contents is preferably 0 to 15%, more preferably 0 to 12%, still more preferably 0.001 to 10%, and particularly preferably 0.1 to 9%. To obtain optical properties to be described later, the CuO content is preferably 1 to 9% and more preferably 2 to 8%.

The metal elements in CuO, Fe$_2$O$_3$, CoO, and CeO$_2$ exist as ions in glass and absorb light in their respective wavelength ranges. Because the range of wavelengths absorbed by each ion differs depending upon the valence and coordination state of the ion, the valence and coordination state of the ion in glass needs to be controlled in order to give a desired light absorption effect. Generally, these ions have a tendency to give higher absorption intensity in the infrared or ultraviolet region with increasing oxidation number. For this reason, to achieve a desired light absorption characteristic, an oxidizing agent, such as antimony (Sb), is generally added to the glass.

In contrast, the optical glass of the present invention has high oxidation performance and therefore has a feature in that it can provide a good light absorption characteristic without addition of any oxidizing agent. Hence, by containing the above components as appropriate, an optical glass element capable of absorbing light in a desired wavelength range can be obtained.

For example, when the optical glass of the present invention contains CuO, it can sharply cut off near-infrared light while maintaining a high transmittance in the visible range. Therefore, the optical glass becomes suitable as a near-infrared light cutoff filter. Specifically, an optical glass can be obtained which, at a thickness of 2.5 mm, has a transmittance of 70% or more at a wavelength of 500 nm and a transmittance of 50% or less at a wavelength of 700 nm. Preferably, an optical glass can be obtained in which, at a thickness of 0.5 mm, the wavelength ($\lambda_{50}$) exhibiting a transmittance of 50% in a wavelength range of 500 to 700 nm is in a range of 590 to 650 nm (or even 600 to 630 nm), the transmittance at 500 nm is 75% or more (or even 80% or more), the transmittance at 700 nm is 30% or less (or even 10% or less), and the transmittance at a wavelength of 1000 nm is 25% or less (or even 20% or less).

Furthermore, when the optical glass of the present invention contains Fe$_2$O$_3$, it can sharply cut off ultraviolet light and becomes suitable as a UV cutoff glass. Specifically, an optical glass can be obtained in which, at a thickness of 2.5 mm, the difference ($\lambda_{70}-\lambda_5$) between the wavelength $\lambda_{70}$ exhibiting a transmittance of 70% and the wavelength $\lambda_5$ exhibiting a transmittance of 5% in a wavelength range of 300 to 500 nm is less than 100 nm.

The optical glass of the present invention can contain, in addition to the above components, the following components.

Al$_2$O$_3$ is a component that contributes to improved weather resistance when added in a small amount and improves the chemical durability, including acid resistance and water resistance. The Al$_2$O$_3$ content is preferably 0 to 10% and more preferably 0 to 5%. If the Al$_2$O$_3$ content is too large, vitrification tends to become unstable.

WO$_3$ is a component for stabilizing vitrification and improving the weather resistance. The WO$_3$ content is preferably 0 to 5% and more preferably 0 to 2%. If the WO$_3$ content is too large, vitrification tends to become unstable to easily devitrify, resulting in reduced transmittance in the visible range.

Besides the above components, Bi$_2$O$_3$, La$_2$O$_3$, Y$_2$O$_3$, Gd$_2$O$_3$, TeO$_2$, SiO$_2$, Ta$_2$O$_5$, Nb$_2$O$_5$, TiO$_2$, ZrO$_2$, Sb$_2$O$_3$ or so on may be contained in the composition without impairing the effects of the present invention. Specifically, the content of each of these components is preferably 0 to 3% and more preferably 0 to 1%.

If the raw material for the glass contains a large amount of U component or Th component as impurities, the resultant glass emits α-rays. Therefore, if the glass is applied to a visibility correction filter or a color tuning filter, α-rays may cause problems with signals of a CCD or CMOS. Hence, the content of each of the U and Th components in the optical glass of the present invention is preferably 20 ppb or less. Furthermore, the dose of α-rays emitted from the optical glass of the present invention is preferably 1.0 c/cm$^2$·h or less.

The optical glass of the present invention preferably has a refractive index (nd) of 1.5 to 1.7, more preferably about 1.52 to about 1.65, and an Abbe's number (vd) of 50 to 70, more preferably about 55 to about 65.

Furthermore, the optical glass of the present invention preferably has a glass transition point (Tg) of 400° C. or below, more preferably 350° C. or below. This provides advantages, such as, for example, the realization of press molding at low temperatures.

Moreover, the optical glass of the present invention preferably has a Class 1 to 5 rating, more preferably a Class 1 to 4 rating, when subjected to a water resistance test specified in JOGIS. Thus, the optical glass becomes less likely to degrade even when exposed to a high-temperature and high-humidity environment for a long period.

Next, a description will be given of a method for producing an optical element, such as an optical lens, using the optical glass of the present invention.

First, glass raw materials are mixed together to give a desired composition and then melted in a glass melting furnace. Next, the molten glass is cast by rapid solidification to form a glass block and the glass block is ground, polished and cleaned to obtain an optical element. Alternatively, the glass may be further press-molded using a precision machined mold to produce an optical element having a desired shape.

EXAMPLES

Hereinafter, the optical glass of the present invention will be described in detail with reference to examples but is not limited to the examples.

(1) Preparation of Each Sample

Table 1 shows examples of the present invention (samples Nos. 1 to 11) and Table 2 shows comparative examples (samples Nos. 12 to 16).

TABLE 1

| (% by mole) | | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|---|
| $P_2O_5$ | | 18.9 | 18.8 | 18.8 | 18.3 | 23.9 | 23.9 | 18.3 | 18.9 | 35.0 | 25.0 | 28.0 |
| $SO_3$ | | 19.1 | 19.0 | 19.1 | 18.5 | 14.1 | 13.1 | 18.5 | 19.1 | 15.1 | 10.0 | 12.0 |
| $Al_2O_3$ | | | | | | | | | | | 2.0 | 2.0 |
| $Li_2O$ | | | | | | | | | | | 5.0 | 5.0 |
| $Na_2O$ | | 19.8 | 19.7 | 19.8 | 19.2 | 19.8 | 19.8 | 16.2 | 19.8 | 13.7 | 8.0 | 8.0 |
| $K_2O$ | | | | | | | | 3.0 | | | 5.0 | 6.0 |
| MgO | | | | | | | 5.0 | | | | | |
| CaO | | | | | | 5.0 | | | | | 1.0 | 2.0 |
| SrO | | | | | | | | | | | 1.0 | 2.0 |
| BaO | | | | | | | | | | | 1.0 | |
| ZnO | | 42.2 | 42.0 | 42.2 | 40.8 | 37.2 | 37.2 | 40.8 | 42.2 | 32.2 | 36.0 | 30.0 |
| $Fe_2O_3$ | | 0.1 | 0.5 | | | 0.01 | | | | | | |
| CoO | | | | | | | | | | 0.1 | | |
| CuO | | | | 0.1 | 3.2 | | 1.0 | 3.2 | | | 4.0 | 6.0 | 5.0 |
| Refractive Index nd | | 1.555 | 1.556 | 1.555 | 1.556 | 1.557 | 1.556 | 1.552 | 1.555 | 1.535 | 1.555 | 1.554 |
| Abbe's Number vd | | 59.1 | 59.1 | 59.1 | 59.0 | 58.9 | 59 | 59.2 | 59.1 | 59.0 | 60.0 | 59.5 |
| Glass Transition Point Tg(° C.) | | 300 | 300 | 300 | 300 | 310 | 310 | 305 | 300 | 310 | 305 | 310 |
| Weather Resistance | | ○ | ○ | ○ | ○ | ○ | ○ | ○ | ○ | ○ | ○ | ○ |
| JOGIS Water Resistance (Class) | | 4 | 4 | 4 | 3 | 4 | 4 | 4 | 4 | 4 | 3 | 3 |
| Transmittance(%) | 500 nm | 88 | 84 | 90 | 77 | 90 | 88 | 77 | 70 | — | 70 | 75 |
| 2.5 mm thickness | 700 nm | 90 | 85 | 50 | 0 | 90 | 0 | 0 | 0 | — | 0 | 0 |
| | 1000 nm | 90 | 85 | 0 | 0 | 90 | 0 | 0 | 0 | — | 0 | 0 |
| $\lambda_{70}$-$\lambda_5$(300~500 nm) 2.5 mm thickness | | 30 | 65 | — | — | 30 | — | — | — | — | — | — |
| Transmittance(%) | 500 nm | | 89 | 91 | 83 | | 89 | 83 | | 81 | 85 | 89 |
| 0.5 mm thickness | 700 nm | | 90 | 83 | 5 | | 25 | 5 | | 5 | 1 | 1.5 |
| | 1000 nm | | 89 | 83 | 2 | | 23 | 3 | | 3 | 0 | 0.5 |
| $\lambda_{50}$ (500~700 nm) 0.5 mm thickness | | | | | 605 | | 650 | 610 | | 605 | 590 | 600 |

TABLE 2

| (% by mole) | | No. 12 | No. 13 | No. 14 | No. 15 | No. 16 |
|---|---|---|---|---|---|---|
| $P_2O_5$ | | 38.0 | 36.8 | 4.9 | 18.9 | 38.0 |
| $SO_3$ | | | | 29.1 | 19.1 | |
| $Na_2O$ | | 19.8 | 19.2 | 21.8 | 19.8 | 19.8 |
| ZnO | | 42.2 | 40.8 | 44.2 | 42.2 | 42.2 |
| $Fe_2O_3$ | | | | | | 0.1 |
| CuO | | | 3.2 | | | |
| Refractive Index nd | | 1.551 | Not Vitrified | Not Vitrified | 1.6 | 1.551 |
| Abbe's Number vd | | 60.5 | | | 59.2 | 60.5 |
| Glass Transition Point Tg(° C.) | | 305 | | | 300 | 305 |
| Weather Resistance | | x | | | x | x |
| JOGIS Water Resistance (Class) | | 6 | | | 5 | 6 |
| Transmittance(%) | 500 nm | 90 | | | 85 | 90 |
| | 800 nm | 90 | | | 90 | 85 |
| | 1000 nm | 90 | | | 90 | 75 |
| $\lambda_{70}$-$\lambda_5$ (300~500 nm) | | — | — | — | >100 | 40 |
| Transmittance(%) | 500 nm | 90 | | | 90 | 91 |
| 0.5 mm thickness | 700 nm | 91 | | | 91 | 91 |
| | 1000 nm | 91 | | | 91 | 91 |
| $\lambda_{50}$ (500~700 nm) 0.5 mm thickness | | | | | | |

Each sample was prepared in the following manner.

First, each set of glass raw materials mixed to give a corresponding composition shown in the above tables were loaded into a platinum crucible and melted at 700 to 800° C. to give a homogeneous melt. Next, the molten glass was allowed to flow on a carbon plate, cooled to become solidified, and then annealed to prepare a glass sample.

(2) Evaluation of Each Sample

Figure 2:
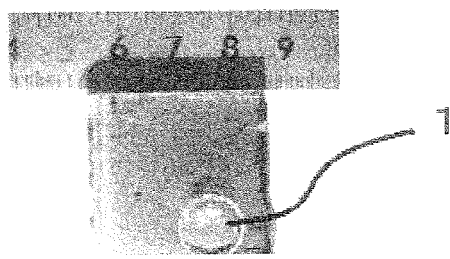
FIG. 2 is photographs of samples No. 4 and No. 13 as examples after their molten glasses were formed.
Figure 2:
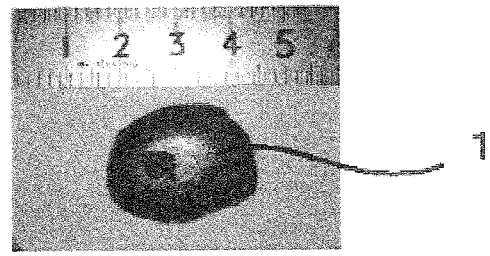
Figure 3:
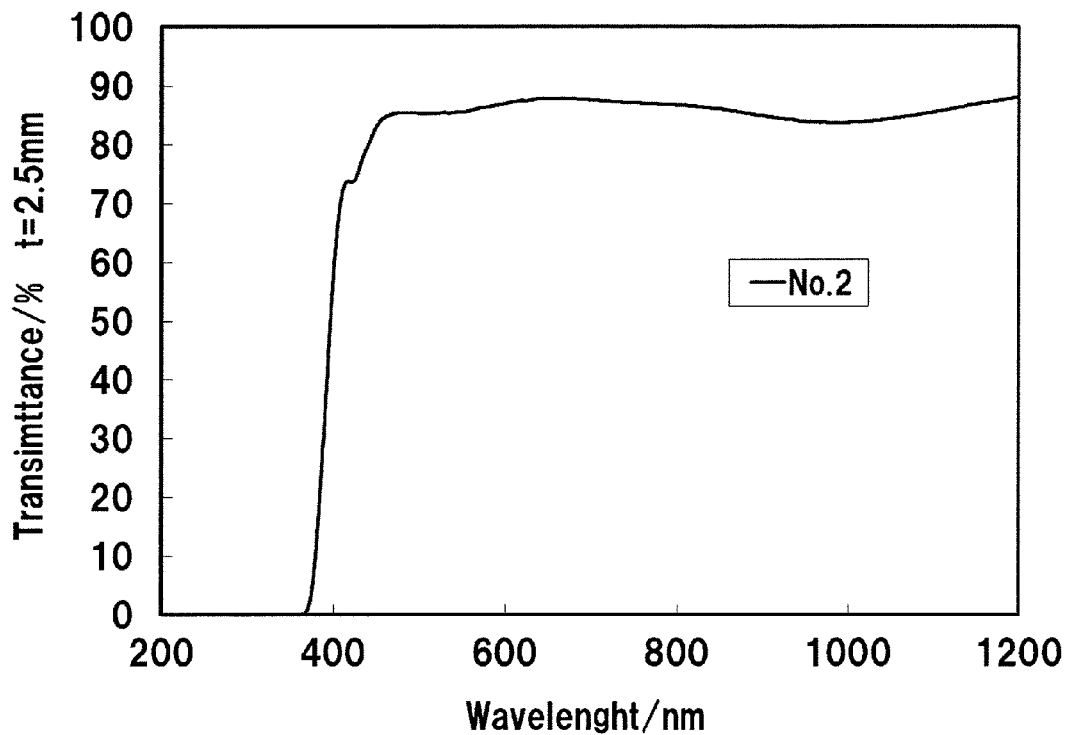
FIG. 3 is a graph showing the transmittance curve of sample No. 2 as an example.
Figure 4:
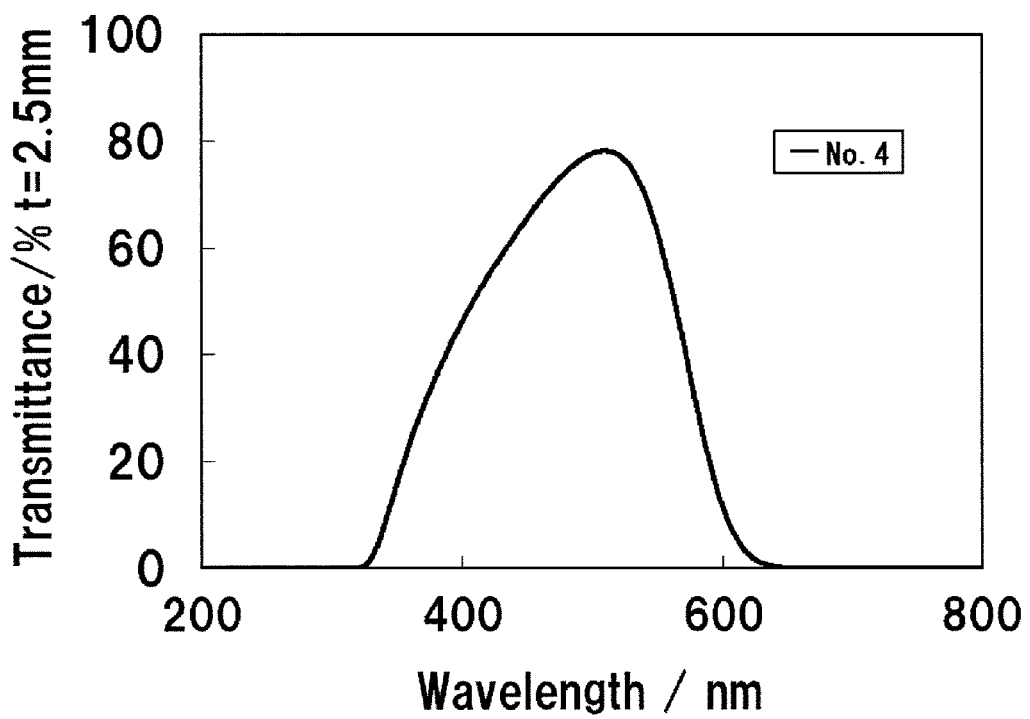
FIG. 4 is a graph showing the transmittance curve of sample No. 4 as an example.
Figure 5:
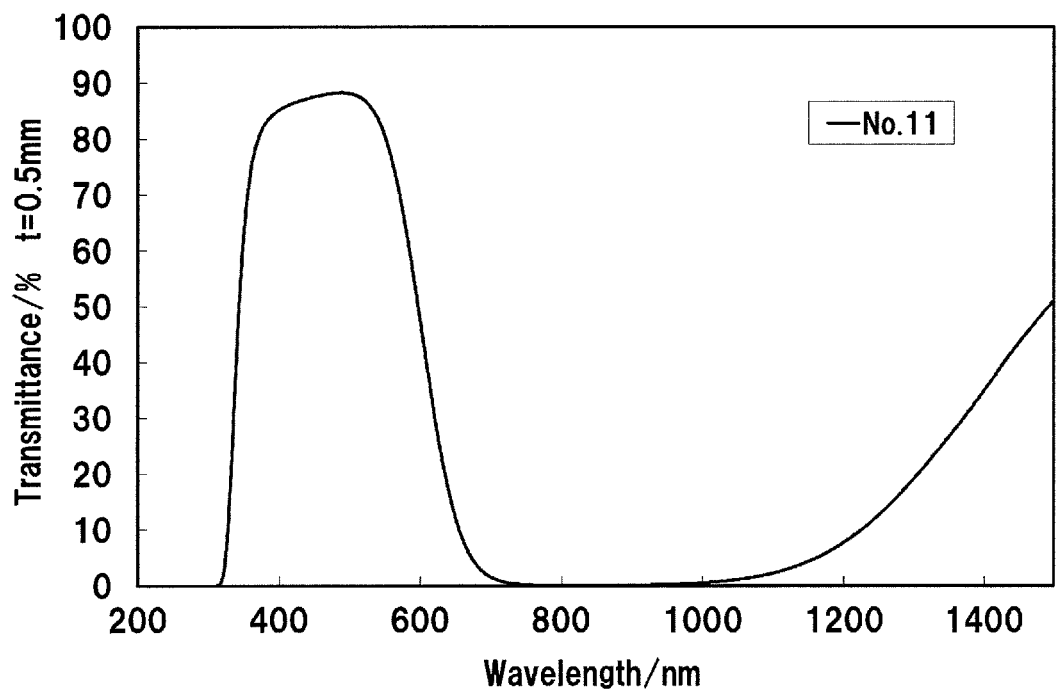
FIG. 5 is a graph showing the transmittance curve of sample No. 11 as an example.

The obtained samples were measured or evaluated for refractive index (nd), Abbe's number (vd), glass transition point (Tg), weather resistance, water resistance, and transmittance by the following methods. The results are shown in Tables 1 and 2. Furthermore, photographs of samples No. 4 and No. 15 after being subjected to a weather resistance test are shown in FIG. 1, photographs of samples No. 4 and No. 13 after their molten glasses were formed are shown in FIG. 2, and the transmittance curves of samples No. 2, No. 4, and No. 11 are shown in FIGS. 3, 4, and 5, respectively.

The refractive index (nd) is indicated by a value measured for the d-line (587.6 nm) of a helium lamp. The measurement of the refractive index was performed with a refractometer (KPR-2000 manufactured by Kalnew Optical Industrial Co., Ltd.). The measurements described below were performed likewise.

The Abbe's number (vd) was calculated using the above refractive index (nd), the refractive index nF for the F-line (486.13 nm) of a hydrogen lamp, and the refractive index nC for the C-line (656.27 nm) of the hydrogen lamp and in accordance with the formula: Abbe's number (vd)=(nd−1)/(nF−nC).

The glass transition point was determined, using a thermal expansion coefficient curve obtained with a dilatometer, from an intersection point between the line in a low-temperature range and the line in a high-temperature range.

The weather resistance was evaluated in the following manner. Each sample was cut in a size of 25×30×5 mm and the sample piece was mirror-polished with cerium oxide powder to prepare a specimen for a weather resistance test. The specimen for a weather resistance test was allowed to stand in an environment at a temperature of 60° C. and a humidity of 90% for 24 hours and determined for how much the transmittance of the specimen at a wavelength of 400 nm decreased after the test as compared to before the test. When the decrease of the transmittance was less than 10%, the specimen was evaluated to be good ("o"). When the decrease of the transmittance was 10% or more, the specimen was evaluated to be no good ("x").

The water resistance was measured in accordance with the water resistance test specified in JOGIS.

The transmittance was measured, using a sample piece of 25×30×2.5 mm and a sample piece of 25×30×0.5 mm which were mirror-polished on both sides, with UV3100PC manufactured by Shimadzu Corporation. $\lambda_{70}-\lambda_5$ at 2.5 mm thickness was determined, using a transmittance curve obtained by the measurement, from the difference between the wavelength $\lambda_{70}$ exhibiting a transmittance of 70% and the wavelength $\lambda_5$ exhibiting a transmittance of 5% in a wavelength range of 300 to 500 nm. Furthermore, $\lambda_{50}$ at 0.5 mm thickness was determined as a wavelength at which the transmittance was 50% in a wavelength range of 500 to 700 nm in a transmittance curve obtained by the measurement.

(3) Consideration of Results

Samples Nos. 1 to 11, which are inventive examples, had desired optical properties and concurrently excellent weather resistance and water resistance. In contrast, samples Nos. 12, 15, and 16, which are comparative examples, had poor weather resistance and water resistance. Furthermore, sample No. 15 exhibited a $\lambda_{70}-\lambda_5$ greater than 100 nm in a wavelength range of 300 to 500 nm and was therefore poor in ultraviolet absorption properties. Samples Nos. 13 and 14 could not be vitrified.

As shown in FIG. 1, sample No. 4 was not found to degrade at the surface even after being subjected to the weather resistance test, whereas sample No. 15 was confirmed to degrade at the surface after being subjected to the weather resistance test. Furthermore, as shown in FIG. 2, sample No. 4 after the forming caused no devitrification and vitrified, whereas sample No. 13 after the forming could not vitrify at all and became a metallic lustered mass.

INDUSTRIAL APPLICABILITY

The optical glass of the present invention can be used as a lens for a digital camera, a cover glass for a CCD, heat-absorbing glass for use in a CCD or CMOS, and an optical filter, such as an IR/UV-absorbing glass, a visibility correction filter, and a color tuning filter.

REFERENCE SIGNS LIST

1 . . . sample

The invention claimed is:

1. An optical glass having a glass composition, in % by mole based on oxide, of 5 to 40% $P_2O_5$, 1 to 35% $SO_3$, 10 to 30% $R'_2O$ (where R' is Li, Na or K), 20 to 50% RO (where R is Mg, Ca, Sr, Ba or Zn), and 0.001 to 15% $CuO+Fe_2O_3+CoO+CeO_2$.

2. The optical glass according to claim 1, having a Class 1 to 5 rating when subjected to a water resistance test specified in JOGIS.

3. An optical element made of the optical glass according to claim 1.

* * * * *